United States Patent [19]

Feng et al.

[11] Patent Number: 4,706,557
[45] Date of Patent: Nov. 17, 1987

[54] CROSS FLOW CONTINUOUS FRYER

[75] Inventors: Chung L. Feng, Overland Park, Kans.; Ching-Wen Yang, Raytown, Mo.

[73] Assignee: Manley, Inc., Kansas City, Mo.

[21] Appl. No.: 884,210

[22] Filed: Jul. 9, 1986

[51] Int. Cl.⁴ .............................................. A47J 37/12
[52] U.S. Cl. ......................................... 99/355; 99/405
[58] Field of Search ................. 99/339, 404, 405, 406, 99/407, 409, 452, 453, 355

[56] References Cited

U.S. PATENT DOCUMENTS 2,926,597  3/1960  Porambo .............................. 99/405
3,733,202  5/1973  Marmor ............................... 99/404
4,357,862  11/1982 Anstett et al. ........................ 99/405

FOREIGN PATENT DOCUMENTS 154125  11/1920  United Kingdom .................. 99/405

Primary Examiner—Henry S. Jaudon

[57] ABSTRACT

An improvement is made to continuous chip fryers by introducing means of control to the flow of oil in the fryer. The disclosure is most applicable to the type of fryers where heat is added externally in a separate heat exchanger. The controlled oil flow allows an increased loading of the fryer, thus reducing equipment size and oil resident time.

4 Claims, 5 Drawing Figures

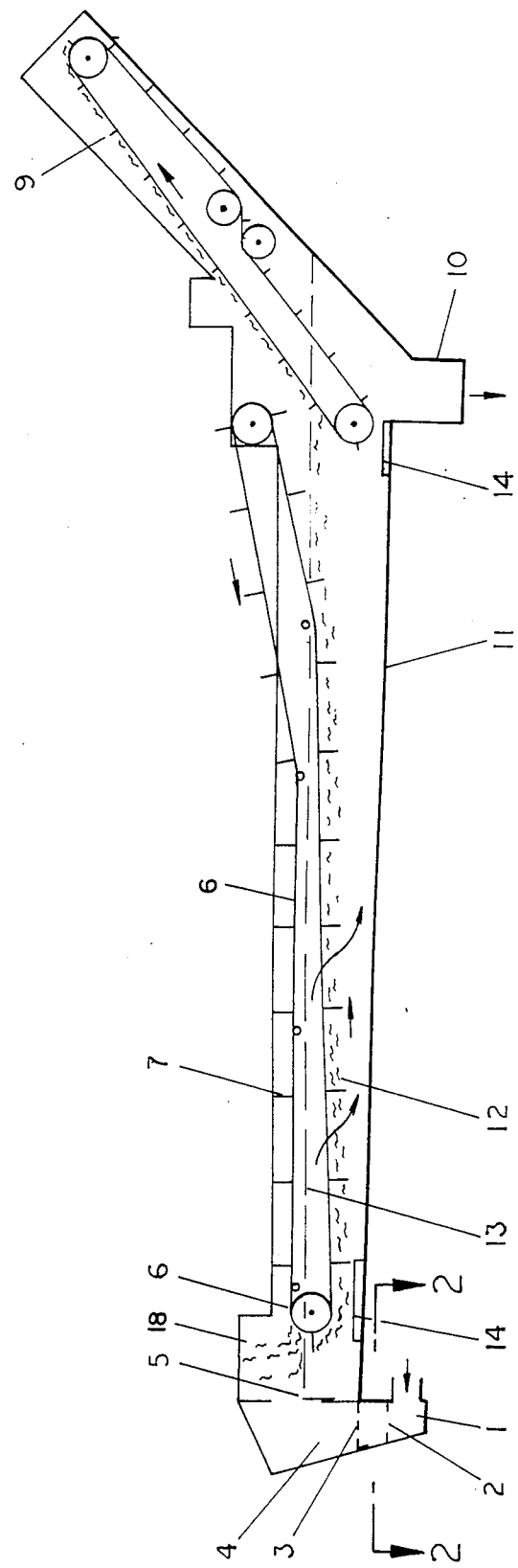

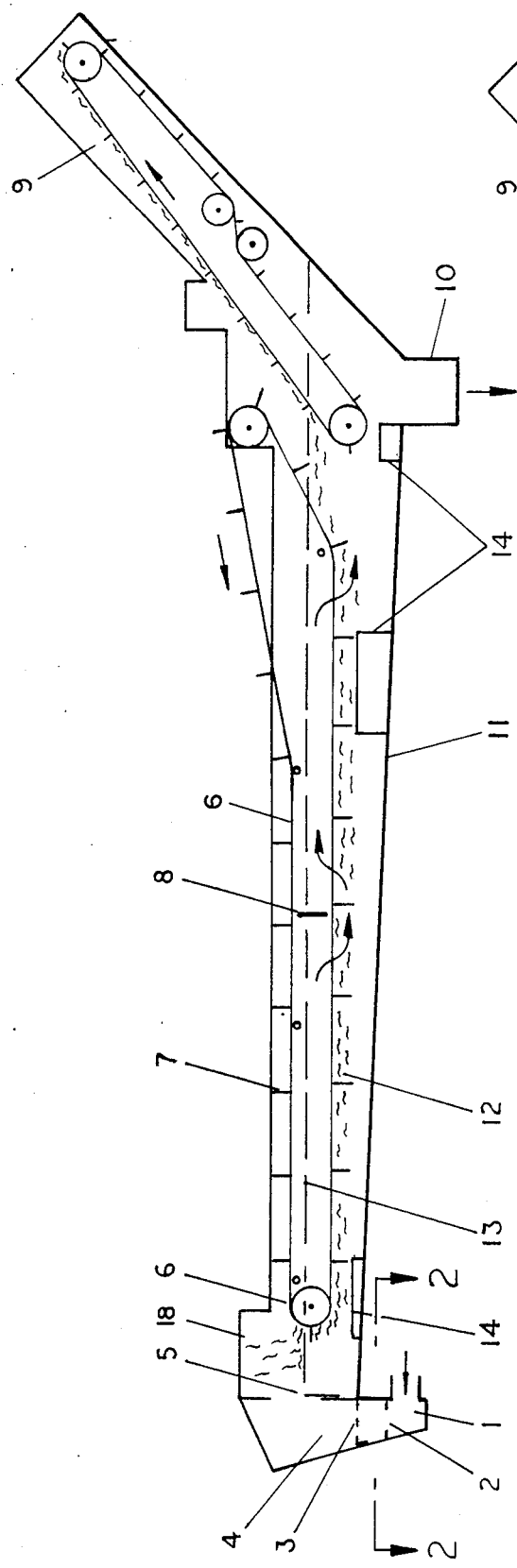
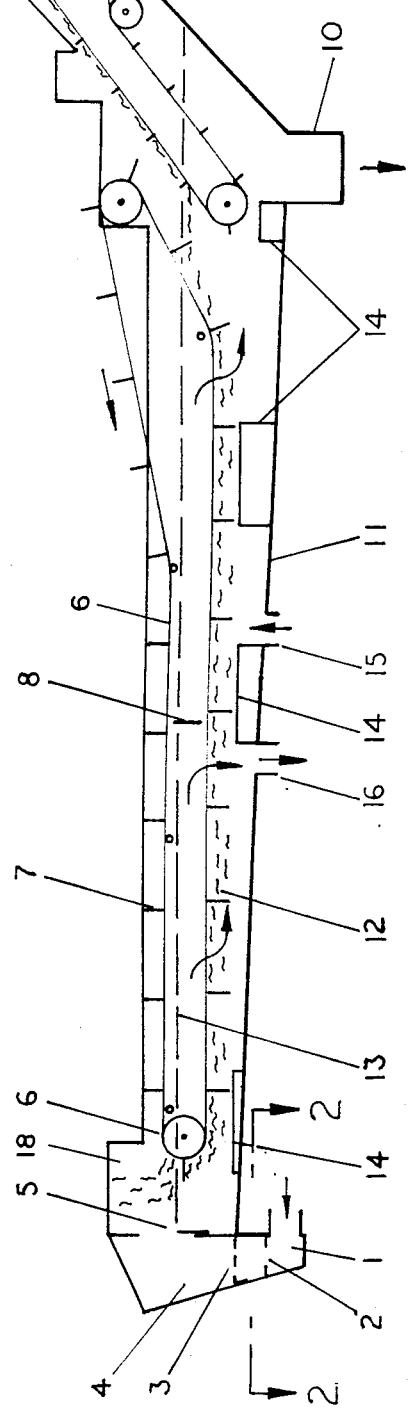

CROSS FLOW CONTINUOUS FRYER

BACKGROUND OF THE INVENTION

A broad class of continuous chip fryers, for example, potato chip and french fry fryers, which require more heat than can be directly applied at the fryer, uses external heat exchangers to heat the oil. The heated oil transfers heat to the chips in the fryer and then returns to the exchanger. The chips in the fryer either float up against a hold down mesh belt known as a submerger or are supported by a conveyor. In either case, the chips form a bed. Since the frying time needed is determined by the product, the production capacity, or rate, of a given size fryer is determined by the depth, or thickness, of the bed. If, for a given size fryer, the production rate and the associated bed thickness are increased, a limit is reached beyond which the frying becomes non-uniform. This limit is the maximum production capacity of this fryer size.

It was discovered that the reason for the non-uniform frying is the shielding of the center layer chips by the outer, top and bottom layer chips from the flow of heated oil from the exchanger. This shielding increases with the bed thickness.

It was also discovered that this shielding effect can be overcome by changing the oil flow pattern.

SUMMARY OF INVENTION

The conventional oil flow pattern is horizontal along the length of the bed. This invention changes this flow pattern by changing the configuration of the fryer. The product bed is made to form a partition in the fryer separating the oil inlet from the heat exchanger and the oil exit to the heat exchanger. The circulation of oil is now through the bed, penetrating all layers. The result is better frying uniformity with thicker bed.

The increased bed thickness leads to both an increased production rate per unit size and a decreased amount of circulating oil per unit production rate. The decrease in the amount of active oil does not decrease the oil consumption but, as oil is removed as part of the product, decreases the resident time of the oil in the fryer. This is a very important factor since the aging of oil at frying temperatures substantially affect the taste of the product.

BRIEF DESCRIPTION OF DRAWINGS

The preferred embodiments are shown in the drawings. FIG. 1 shows the embodiment utilizing a tilted submerger to position the product bed. The near wall of the fryer is omitted from the drawings to show the function of various parts. Hot oil from the heat exchanger entering the fryer at the left end, which is also shown as the inlet end for the product. The hot oil first goes through a coarse distribution plate to distribute flow across the width of the fryer. FIG. 2 shows a possible hole pattern for this coarse distribution plate. Curved arrows in FIGS. 1, 3 and 4 indicate generally the oil flow pattern being forced through the bed.

FIGS. 3 and 4 show possible arrangements without tilting the bed as well as the possibilities of having the flow through different parts of the bed connected either in series or in parallel.

DESCRIPTION OF THE PREFERRED EMBODIMENTS

Figure 5:
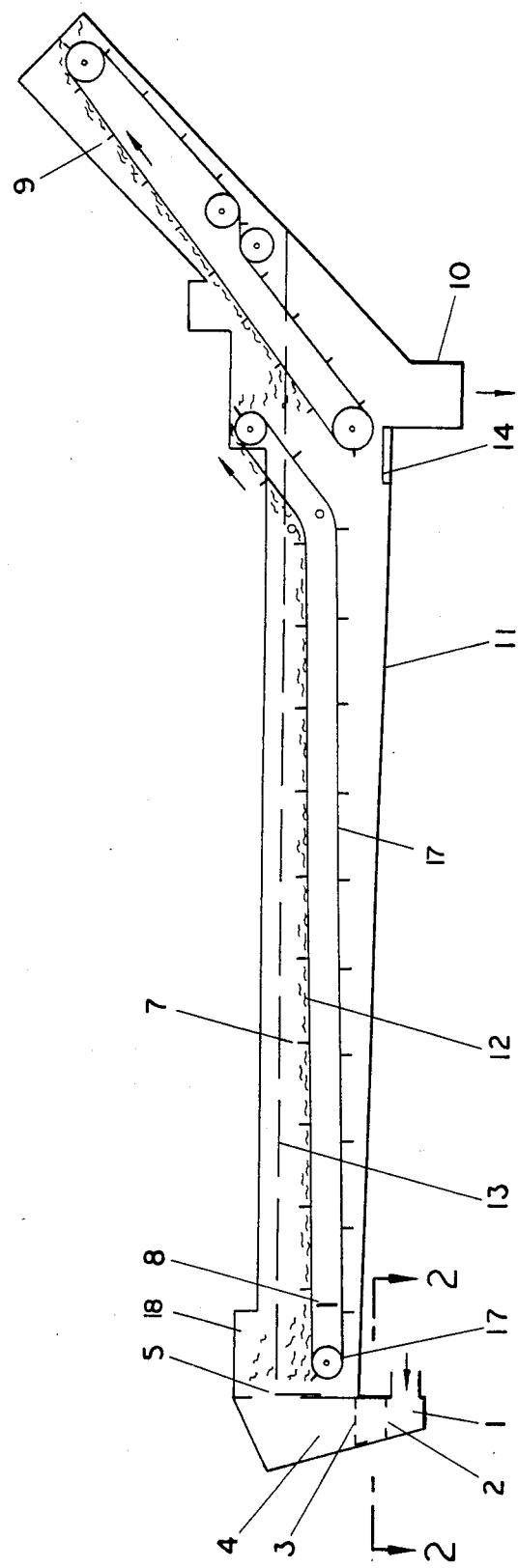
FIG. 5 shows the general arrangements when the submerger is replaced by a support conveyor for sinking products.

Referring to FIG. 1, oil from heat exchanger enters fryer at inlet manifold (1). This flow is distributed across the width of the fryer first by a coarse distribution plate (2) and then by a fine distribution plate (3). The distribution plates have coarse or fine openings to establish a pressure drop in the oil flow matching the pressures locally available. The oil distribution is further refined by a weir plate (5). Raw chips are dropped into the space, dropzone 18, between weir (5) and conveyor shown as a submerger (6). The oil flow from the weir is toward (6) near the surface but toward (5) near the bottom. This action keeps slow cooking chips, still sinking, from attaching to the submerger. The results is more uniform frying.

The submerger 6 is an open mesh belt with attached flights (7). The combination of flights (7) and a dam (14) prevents oil from flowing under the bed and forces oil to flow through the open mesh of the belt. Floating chips are carried between flights and form a bed (12) under the oil surface (13). Therefore, the hot oil must flow downward through the bed as indicated by the curved arrows. Oil is cooled by the bed and then forced through a second open mesh belt known as the take-out conveyor 9. This conveyor filters the product and crumbs out of the oil. The oil is then returned to the heat exchanger connection (10) at the bottom of the fryer (11).

FIG. 2 is a top view of the coarse distrubution plate (2). With oil entering at the mid-point of the manifold, the oil pressure is higher at the center and the two ends than elsewhere. The hole openings in the plate are sized accordingly.

FIG. 3 shows an embodiment suitable for long fryers as well as short fryers. The various components and functions are the same as embodiment shown in FIG. 1, except that the submerger 6 need not be tilted and oil flow is forced by one or more baffles (8) and a number of dams (14). As oil paths between inlet and exit are selectively blocked by baffle (8) above the bed and flights plus dams below the bed, the oil is forced to flow through the bed in one or more passes.

FIG. 4 shows an embodiment similar to that shown by FIG. 3, except that additional inlet (15) and exit (16) are added to allow parallel oil flow paths. The oil temperature and flow velocity of one path may be controlled, within limits, independently of other paths to suit a particular product or process.

FIG. 5 shows the submerger (6) of FIGS. 1, 3 and 4 replaced by a support conveyor (17). Sinking products are carried above conveyor (17) but still form a bed separating the oil into inlet side and exit side.

We claim:

1. A cross flow continuous fryer comprising
   means to contain a bath of oil,
   means to distribute oil flow within said container means,
   a tilted continuous belt with flights which act to both move a product and to control flow of said oil within said container,
   a series of dams within said container which act to shape the oil passages, and
   means to remove said product from said fryer.
2. A cross flow continuous fryer comprising
   means to contain a bath of oil, means to distribute oil flow within said container means, a continuous belt with flights which act both to move a product and to control flow of said oil a series of baffles within said container means which separate oil flow into multiple passages, a series of outlets and inlets to further assist parallel oil flow through multiple passages, and means to remove said product from said fryer.

3. A fryer according to claims 1 or 2 wherein said belt is a submerger conveyor.

4. A fryer according to claims 1 or 2 wherein said belt is a support conveyor.

* * * * *